Patented Dec. 5, 1922.

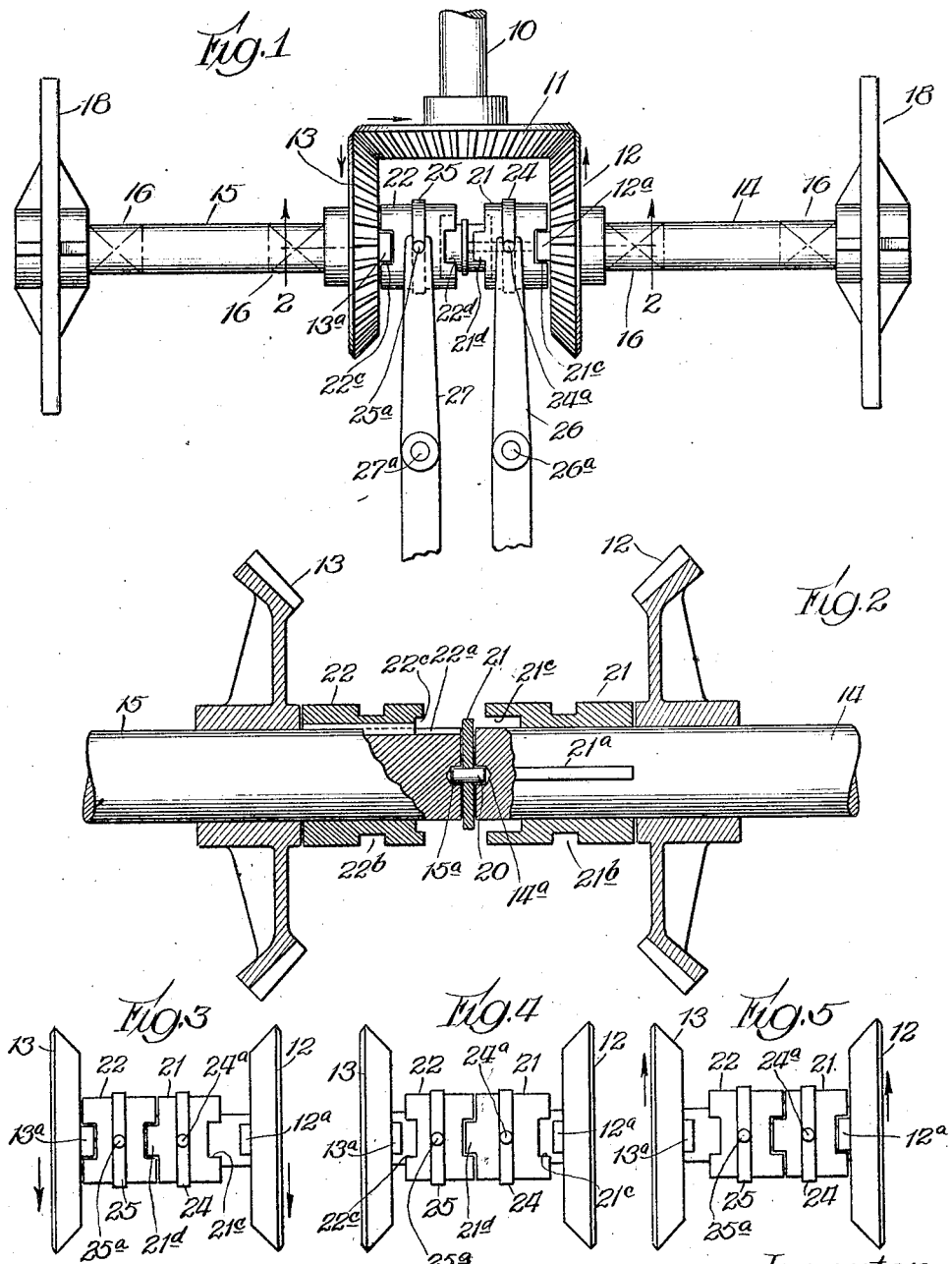

1,437,639

UNITED STATES PATENT OFFICE.

ASGER EILERSGAARD, OF CHICAGO, ILLINOIS, ASSIGNOR TO HANNA ENGINEERING WORKS, OF CHICAGO, ILLINOIS, A CORPORATION OF ILLINOIS.

DRIVING MECHANISM.

Application filed March 7, 1921. Serial No. 450,372.

*To all whom it may concern:*

Be it known that I, ASGER EILERSGAARD, a citizen of the United States, residing at Chicago, in the county of Cook and State of Illinois, have invented certain new and useful Improvements in Driving Mechanism, of which the following is a specification.

This invention relates to improvements in driving mechanism and has for its object to provide a new and improved form of driving mechanism especially applicable to mobile cranes, excavators, or similar machines, the construction being such as to permit ready handling and steering of such machines.

A further object is to provide a simple construction of the class described which will permit rotation of the rear axle and driving members simultaneously in the same direction or in opposite directions, or will permit actuation of one of such members in either direction while the other member is idling.

These and other objects and the mechanism whereby they are accomplished will be more fully set forth and described in the following specification and shown in the accompanying drawing in which—

Figure 1 is a plan view of the mechanism embodying my invention;

Fig. 2 is a vertical section through a portion of the gearing;

Fig. 3 is a diagrammatic view showing the clutches in one position;

Fig. 4 is a similar view showing them in another position; and

Fig. 5 is a similar view showing them in still another position.

Like numerals refer to like elements throughout the drawings in which—

10 indicates a rotating drive shaft which may be connected with any suitable source of power, gas engine, steam motor or the like. In the embodiment shown, shaft 10 carries the bevel gear 11 in constant mesh with a pair of bevel pinions 12 and 13 which are rotatably mounted on the axle shafts 14 and 15, respectively. Suitable bearings 16 are provided for the shaft 14 and 15, as diagrammatically indicated on Fig. 1, and these shafts carry at their outer extremities elements 18 which may be supporting wheels or actuating gears for endless tread or other tractor mechanism, depending upon the form of support utilized.

The shafts 14 and 15 project inwardly of and through the gears 12 and 13, as shown in Fig. 2, for example, terminating with their ends adjacent in slightly spaced relation, rotatable dowel pin 20 being inserted in the central apertures 14ª and 15ª. A floating washer or disk 21 is mounted upon the dowel pin 20, being of greater diameter than the shafts 14 and 15. A clutch sleeve 21 is splined or keyed to the shaft 14 inwardly of the gear 12, being slidably mounted thereon to rotate therewith by virtue of the spline or key 21ª (see Fig. 2). A similar sleeve 22 is slidably mounted upon the inner end of shaft 15, being secured for rotation therewith by the spline or key 22ª. The sleeves 21 and 22 are provided with peripheral grooves 21ᵇ and 22ᵇ, respectively, in which are rotatably mounted the collars 24 and 25, respectively, and these collars are provided with studs 24ª and 25ª, respectively. A pair of operating levers 26 and 27 are attached to the studs 24ª and 25ª, being pivoted at points 26ª, 27ª, respectively. These levers may be attached to any suitable operating handle or mechanism to oscillate them about their pivotal points, and thereby shift either or both of the sleeves 21 and 22 to one of three positions.

Sleeves 21 and 22 are provided at their outer ends with the jaws 21ᶜ, 22ᶜ, engageable with lugs 12ª, 13ª carried by the gears 12 and 13, respectively, (see Fig. 1).

At its other face the sleeve 21 is provided with the teeth 21ᵈ, while the adjacent face of sleeve 22 is provided with the jaws 22ᵈ, meshable with the teeth 21ᵈ.

The sleeves 21, 22 are recessed at their adjacent ends, as indicated by numerals 21ᵉ, 22ᵉ, to permit the movement of the washer 21 into mutual engagement.

Assuming the driving gear 11 to be rotating in the direction indicated by the arrows in Fig. 1 with the sleeves 21 and 22 in engagement with the gears 12, 13, as shown in Fig. 1, such gears rotating in the direction of the arrows shown in Fig. 1, this rotation will be transmitted to the shafts 14 and 15 and elements 18, resulting in a relatively reverse rotation of these elements, which would result in the quick turning of the machine to which they might be applied.

Assuming the operating lever 26 to be shifted to mesh sleeve 21 with sleeve 22, as shown in Fig. 3, pinion 12 will idle, and rotation of pinion 13 will be transmitted through sleeve 22 to shaft 15, and through sleeve 21 to shaft 14, resulting in the rotation of both elements 18 in the same direction. Similar shifting of both levers 26 and 27 to move the sleeves 21 and 22 to the positions shown in Fig. 5 will result in rotation of both elements in the same direction and in a direction opposite to that of Fig. 3.

With the sleeves 21 and 22 moved out of engagement with both pinions 12 and 13, the elements 18 will be at rest as no driving effect will be transmitted thereto.

With either of the sleeves 21 or 22 in engagement with the corresponding pinion 12 or 13, the other sleeve out of engagement with its pinion, rotation of one of the elements 18 will be effected as will be obvious.

It will thus be seen that I have provided means to actuate both of the elements 18 in either forward or reverse direction simultaneously for driving of a machine. Also I may drive these elements simultaneously in opposite directions for quick turning of such a machine, while I may also drive but one of the elements 18 for a slower turning of the machine, or finally both of the elements 18 may be freed from any driving effect, enabling the machine to be maintained at rest. The mechanism whereby I accomplish this is comparatively simple and easily operated.

It will be obvious that my invention is susceptible of modification and improvement and I do not wish to be restricted to the form shown, except as defined in the appended claims.

What I claim is:

1. Mechanism of the class described, comprising a driving member, members driven thereby, a pair of shafts, said driven members being rotatable on said shafts, and an engaging member carried by each of said shafts, said engaging members being mutually engageable and each engageable with one of said driven members.

2. Mechanism of the class described, comprising a driving member, a pair of members driven thereby, a pair of shafts, said driven members being rotatable on said shafts, and an engaging member carried by each of said shafts, each of said engaging members being movable to one of three operating positions.

3. Mechanism of the class described, comprising a driving member, a pair of members driven thereby, a pair of shafts, said driven members being rotatable on said shafts, and an engaging member carried by each of said shafts, each of said engaging members being movable to one of three operating positions, the other of said engaging members being engageable therewith in either of said positions.

4. Mechanism of the class described, comprising a driving member, members driven thereby, a pair of shafts, said driven members being rotatable on said shafts, an engaging member carried by each of said shafts, said engaging members being mutually engageable and each engageable with one of said driven members, and operating members operatively attached to said engaging members.

5. Mechanism of the class described, comprising a driving member, a pair of members driven thereby, a pair of shafts, said driven members being rotatable on said shafts, an engaging member carried by each of said shafts, each of said engaging members being movable to one of three operating positions, the other of said engaging members being engageable therewith in either of said positions, and a limiting means interposed between said engaging members, the latter being recessed to fit over said limiting means.

6. Mechanism of the class described, comprising a driving member, a pair of members driven thereby, a pair of shafts extending through said driven members, the latter being rotatable with respect to said shafts, an engaging member carried by each of said shafts inwardly of the driven member mounted thereon, and a limiting means interposed between said engaging members.

7. Mechanism of the class described, comprising a driving member, a pair of members driven thereby, a pair of shafts extending through said driven members, the latter being rotatable with respect to said shafts, an engaging member carried by each of said shafts inwardly of the driven member mounted thereon, and a limiting means interposed between said engaging members, said limiting means comprising a washer located between the ends of said shafts.

8. Mechanism of the class described, comprising a driving member, a pair of members driven thereby, a pair of shafts extending through said driven members, the latter being rotatable with respect to said shafts, an engaging member carried by each of said shafts inwardly of the driven member mounted thereon, a limiting means interposed between said engaging members, said limiting means comprising a washer located between the ends of said shafts, and a dowel pin rotatably seated in the ends of said shafts, said washer being carried on said dowel pin.

9. Mechanism of the class described, comprising a driving gear, a pair of driven gears in mesh therewith, a pair of shafts extending through said driven gears, the latter being rotatable thereon, and a clutch member on each of said shafts inwardly of said driven gears, each of said clutch members being movable into engagement with the corresponding driven gear and also movable into engagement with the other of said clutch members.

10. Mechanism of the class described, comprising a driving gear, a pair of driven gears in mesh therewith, a pair of shafts extending through said driven gears, the latter being rotatable thereon, a clutch member on each of said shafts inwardly of said driven gears, each of said clutch members being movable into engagement with the corresponding driven gear and also movable into engagement with the other of said clutch members, and a pivoted operating lever engageable with each of said clutch members.

11. Mechanism of the class described, comprising a driving gear, a pair of driven gears in mesh therewith, a pair of shafts extending through said driven gears, the latter being rotatable thereon, a clutch member on each of said shafts inwardly of said driven gears, each of said clutch members being movable into engagement with the corresponding driven gear and also movable into engagement with the other of said clutch members, each of said clutch members being provided with a peripheral groove, a collar rotatably mounted in said groove, and an operating lever attached to said collar.

In testimony whereof, I have subscribed my name.

ASGER EILERSGAARD.